United States Patent
Armbruster et al.

(10) Patent No.: US 9,187,883 B2
(45) Date of Patent: Nov. 17, 2015

(54) FITTING MAIN BODY FOR A SANITARY FITTING

(71) Applicant: Hansgrohe SE, Schiltach (DE)

(72) Inventors: Jochen Armbruster, Wolfach (DE); Horst Flieger, Schiltach (DE); Bernd Kronenbitter, Nordrach (DE)

(73) Assignee: Hansgrohe SE, Schiltach (DE)

( * ) Notice: Subject to any disclaimer, the term of this patent is extended or adjusted under 35 U.S.C. 154(b) by 98 days.

(21) Appl. No.: 13/800,752

(22) Filed: Mar. 13, 2013

(65) Prior Publication Data

US 2013/0241196 A1 Sep. 19, 2013

(30) Foreign Application Priority Data

Mar. 16, 2012 (DE) .......................... 10 2012 204 139

(51) Int. Cl.
| | |
|---|---|
| E03C 1/04 | (2006.01) |
| E03C 1/02 | (2006.01) |
| F16K 27/00 | (2006.01) |
| F16K 27/12 | (2006.01) |

(Continued)

(52) U.S. Cl.
CPC ... *E03C 1/04* (2013.01); *E03C 1/02* (2013.01); *F15B 13/081* (2013.01); *F15B 13/0871* (2013.01); *F16L 41/03* (2013.01); *Y10T 137/87885* (2015.04); *Y10T 137/87917* (2015.04); *Y10T 137/87925* (2015.04); *Y10T 137/88062* (2015.04)

(58) Field of Classification Search
CPC ........... E03C 1/04; E03C 1/02; F15B 13/081; F15B 13/0871; Y10T 137/87917; Y10T 137/87885; Y10T 137/88062; Y10T 137/87925; F16K 27/00; F16K 27/12
USPC .............. 137/884, 613, 614, 614.21; 251/367
See application file for complete search history.

(56) References Cited

U.S. PATENT DOCUMENTS

| | | | | |
|---|---|---|---|---|
| 3,728,746 A | * | 4/1973 | Konen et al. ..................... 4/696 |
| 5,356,074 A | * | 10/1994 | Limet et al. ................ 236/12.22 |
| 5,924,449 A | | 7/1999 | Enoki et al. |

(Continued)

FOREIGN PATENT DOCUMENTS

| | | |
|---|---|---|
| DE | 3406987 C2 | 8/1985 |
| DE | 3941106 C2 | 5/1991 |

(Continued)

OTHER PUBLICATIONS

DE Office Action dated Jan. 17, 2013 in application 10 2012 204 139.7.

(Continued)

*Primary Examiner* — Atif Chaudry
(74) *Attorney, Agent, or Firm* — Duane Morris LLP

(57) ABSTRACT

Proposed is a fitting main body in which are arranged receptacles for the connections of the sanitary fitting to the water line, receptacles for a thermostat valve and a flow-rate regulating valve, and all water channels. The water channels are formed at least in part as flat ducts open towards one side of the fitting main body, wherein the longitudinal direction of the cross section through the flat ducts runs perpendicular to the side of the fitting main body. The ducts are closed off by a cover which is connected to the fitting main body. As a result, that part of the sanitary fitting which comprises all of the water channels is composed of the fitting main body and a cover.

15 Claims, 4 Drawing Sheets

(51) Int. Cl.
 *F15B 13/08* (2006.01)
 *F16L 41/03* (2006.01)

(56) References Cited

U.S. PATENT DOCUMENTS

| | | | |
|---|---|---|---|
| 6,016,838 A * | 1/2000 | Wigmore | 137/625.64 |
| 6,279,604 B1 * | 8/2001 | Korb et al. | 137/359 |
| 7,854,401 B2 | 12/2010 | Malek | |
| 2004/0173270 A1 * | 9/2004 | Harris et al. | 137/884 |
| 2006/0130918 A1 | 6/2006 | Kisling | |
| 2008/0011374 A1 * | 1/2008 | Hidaka et al. | 137/884 |
| 2008/0112843 A1 * | 5/2008 | Peel et al. | 422/2 |

FOREIGN PATENT DOCUMENTS

| | | |
|---|---|---|
| DE | 19510670 A1 | 10/1996 |
| EP | 0943740 A2 * | 12/1999 |
| JP | 2008231885 A | 10/2008 |
| WO | 2005111325 A1 | 11/2005 |

OTHER PUBLICATIONS

European Patent Office, European Search Report regarding corresponding European Application No. 13158717.2 issued Jun. 11, 2015, pp. 1-6.

* cited by examiner

FITTING MAIN BODY FOR A SANITARY FITTING

The invention relates to a sanitary fitting having a fitting main body.

Sanitary fittings for mounting on plaster or under plaster typically have a fitting body into which lead at least two spaced-apart connectors. By means of said connectors, the fitting body is connected to the end of two water lines which lead out of the wall. The fitting main body is normally arranged horizontally. Vertical arrangements however also exist. The fitting main body generally comprises a mixing valve, which is preferably a thermostat valve, and a flow-rate regulating valve. In the fitting main body there are formed ducts which form the water channels to an outlet. Here, the fitting main body is often composed of a multiplicity of parts which must be assembled and which, by means of seals, separate the individual water guides from one another.

A sanitary mixing faucet for mounting on a wall is already known in which the fitting main body is arranged in a cylindrical casing which runs horizontally. The fitting main body has a spacing to the wall (DE 3941106 C2).

In the case of a further mixing faucet, the water channels are formed in part in the intermediate space between a fitting main body and a casing surrounding said fitting main body. Here, too, seals are provided for separating the individual water guides from one another. Said fitting main body, too, has a spacing to the wall from which the supply lines emerge (EP 0647808 B1).

Likewise known is a housing for a wall-mounted bath mixer faucet in which the mixer faucet itself is mounted on an outer side of the housing. The housing is formed in one piece and has large internal spaces for the water channels (DE 3406987 C2).

Such sanitary fittings are normally produced from metal at least in the region of their fitting main body.

The invention is based on the object of providing a fitting which is of simple construction and space-saving design and which is in particular also suitable for being produced from plastic.

To achieve said object, the invention proposes a sanitary fitting comprising a connector region having at least two connectors for connection to in each case one water line, at least one receptacle for a valve device, a connector for an outlet from the sanitary fitting, and ducts between the connectors, the valve device and the outlet, which ducts are formed in the fitting main body, said fitting main body having a connector block and a cover block connected to said connector block along a parting surface, wherein at least one of said ducts is open in the direction of the parting surface and does not have an undercut in the direction of the parting surface. The subclaims relate to refinements of the invention.

Production is simplified as a result of the provision of a duct which is open in the direction of the parting surface between the two parts of the fitting main body and which is closed by a cover block. It is possible in particular to make do with moulds of simple construction for production from plastic. Production from metal is however also possible with said principle.

The fitting main body has two connectors for connection to in each case one water line, the spacing of which connectors corresponds to the conventional spacing of the water lines in the wall. The fitting main body may be formed so as to have a spacing to the wall or else so as to be arranged closely in front of the wall.

In one refinement of the invention, it may be provided that at least one duct runs parallel to the parting surface and has a cross section which is closed by the cover block.

In one refinement of the invention, it may be provided that the valve device which is arranged in a receptacle is a mixing valve which is hydraulically connected via two inflow ducts to in each case one connector. It may be provided here that the receptacle for the mixing valve is arranged in the vicinity of a connector, such that a simple aperture between the two receptacles forms one of the two inlet ducts. The second inlet duct then leads from the other connector through the fitting main body to the receptacle for the thermostat valve. A mixed-water duct then leads from the thermostat valve to a second receptacle in which a flow-rate regulating valve is arranged. An outflow duct then leads from said flow-rate regulating valve to the outlet from the sanitary fitting.

With the exception of the direct aperture between the receptacle for the thermostat valve and the associated inlet, it is possible in particular for all of said ducts to be open.

In another refinement of the invention, it may be provided that at least one duct is formed as a flat duct with at least two approximately parallel walls. Here, the approximation to parallelism should allow for the possibility of demoulding if the fitting main body is to be produced by means of a casting process or injection moulding.

In particular, it may be provided that the longitudinal direction of the cross section of the flat duct runs perpendicular to the parting surface between the cover block and the connector block of the fitting main body. The parting surface may preferably be approximately planar.

In a refinement of the invention, it may be provided that multiple ducts are open towards the same side of the connector block of the fitting main body.

It may be provided according to the invention that multiple ducts which are open towards the same side of the connector block are closed off by a single cover.

A further possibility proposed by the invention consists in ducts being open towards two different sides of the connector block.

In this case, the use of two covers is expedient.

It may be provided according to the invention that, when ducts are open towards two different sides of the connector block, said two sides of the connector block are situated opposite one another, preferably or in particular also parallel to one another.

In another refinement of the invention, it may be provided that the axes of the receptacles for the valve device are situated in the same plane as the axes of the connectors. In this way, it is possible to produce a very flat fitting main body, which also leads to a very flat fitting.

Here, consideration is given to the fact that the two connectors for the water lines are basically already arranged horizontally owing to the arrangement of the water lines in the wall.

In one refinement of the invention, it may be provided that the receptacles for the valve device are arranged or formed in the fitting main body or in the connector block thereof such that their axes run perpendicular to the axes of the connectors. If, therefore, as is conventional, the receptacles on the rear side of the fitting main body are arranged parallel to one another, then the receptacles for the valve device may be arranged such that they can be accessed from the right and from the left.

It is however also conceivable that they can be accessed from below or from above. It is likewise possible for the valve axes to be oriented obliquely in space.

In another refinement of the invention, it may be provided that the ducts, in particular the flat ducts, run without crossing one another. It may be provided that the ducts run at least partially parallel to one another.

The parallel profile of the flat ducts may be utilized to ensure that the fitting main body is of space-saving design.

In another refinement of the invention, it may be provided that the walls of the ducts in the fitting main body are separated by intermediate spaces, such that said walls are spaced apart from one another. This may have advantages with regard to the temperature differences that arise in a fitting main body of said type.

For reinforcement, it may be provided that the walls of the ducts are provided, on the outer side, with ribs, wherein the ribs if appropriate also connect two walls of adjacent ducts to one another.

It may be provided according to the invention that the connector block of the fitting main body and/or the cover block are/is of unipartite form. The fitting main body is then composed, if appropriate, of a total of two parts, which can then be assembled in a very simple manner.

It may be provided according to the invention that the housing is at least partly composed of metal.

It has proven to be particularly preferable for the housing to be produced at least partly from plastic. This has advantages in particular if it is necessary to prevent the drinking water from coming into contact with metal.

In the case of the connectors for the water line, it may be provided according to the invention that the connectors are formed as receptacles for connection to S-type connectors. Such S-type connectors are generally known. The receptacles may then be formed as simple cylindrical hollow chambers, with facilities for locking to the S-type connector.

It is however also conceivable for the fitting main body to have, in the case of one or both connectors, an insert which is formed for receiving the S-type connector. The insert may be composed of the same material as the fitting main body or else of a different material, for example may be formed as a metal insert in the case of a fitting main body composed of plastic. Said insert may have been encapsulated by insert moulding during the production of the fitting main body or else may also have been inserted retroactively. All connectors may be reinforced by inlaid metal bushings.

The outlet from the fitting main body may for example have a pipe connector thread which is formed in the fitting main body itself or else is formed in an insert inserted into the fitting main body.

Further features, details and advantages of the invention will emerge from the claims and from the abstract, the wording of each of which is incorporated in the content of the description by reference, from the following description of preferred embodiments of the invention, and on the basis of the drawing, in which:

Figure 1:
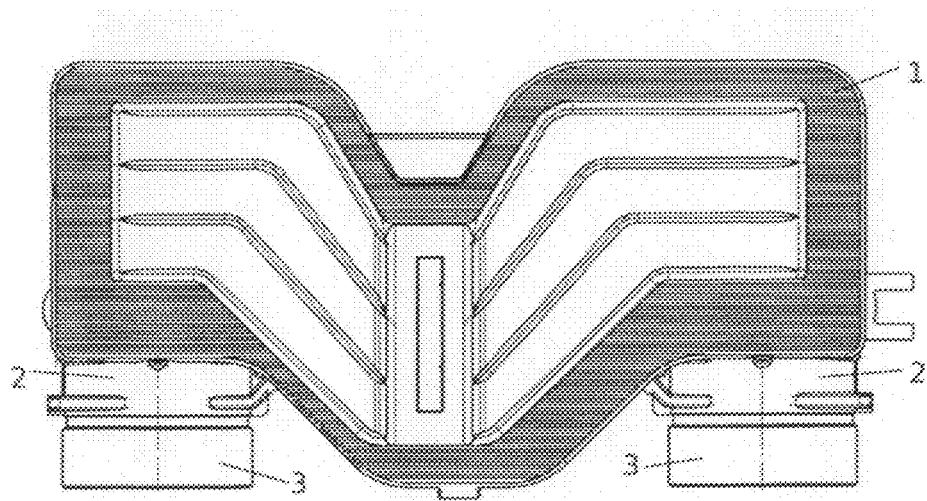
FIG. 1 shows a plan view of a fitting main body of the sanitary fitting according to the invention.

FIG. 1 shows a plan view of the fitting main body. Here, from the top side, it is possible to see only a cover 1 which is fastened to the top side of a connector block 4 of the fitting main body. The lower side of the fitting main body in FIG. 1 is the connector side designed to face the wall. Here, the fitting main body forms two connector pieces 2 which have in each case one insert 3 composed, if appropriate, of a different material. The two inserts 3 form a connection facility for the connection of a water line. Said inserts are arranged on both ends of the fitting main body and have a spacing to one another which is defined in accordance with a standard. The two inserts 3 and thus the two connectors have in each case one axis, wherein the axes of the two inserts 3 run parallel to one another.

Figure 2:
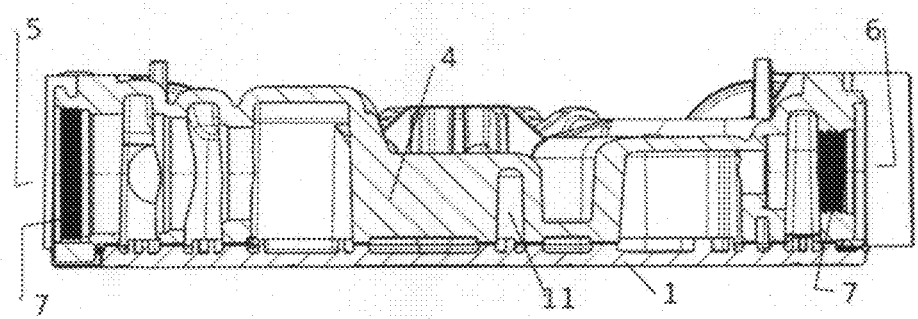
FIG. 2 shows a longitudinal section in a plane running perpendicular to the drawing plane of FIG. 1.

FIG. 2 shows a section in a plane perpendicular to the drawing plane of FIG. 1 and at the level of the receptacles for valve devices.

In the illustration of FIG. 2, the cover 1 is arranged at the bottom, whereas the connector block 4 of the fitting main body is then illustrated above the cover 1. On the left in FIG. 2 there is formed a receptacle 5 for a thermostat valve, and on the right in FIG. 2 there is formed a receptacle 6 for a flow-rate regulating valve. Both receptacles 5, 6 comprise an internal thread 7 for the respective valve insert to be screwed into. The cover 1 is for example welded or adhesively bonded to the connector block 4 of the fitting main body.

The receptacles 5, 6 for the respective valve devices have in each case one axis, which axes, in the illustrated example, lie in the same plane as the axes of the inserts 3 for the water lines. The axes of the receptacles 5, 6 for the valve device are however perpendicular to the axes of the connectors for the water lines.

Figure 3:
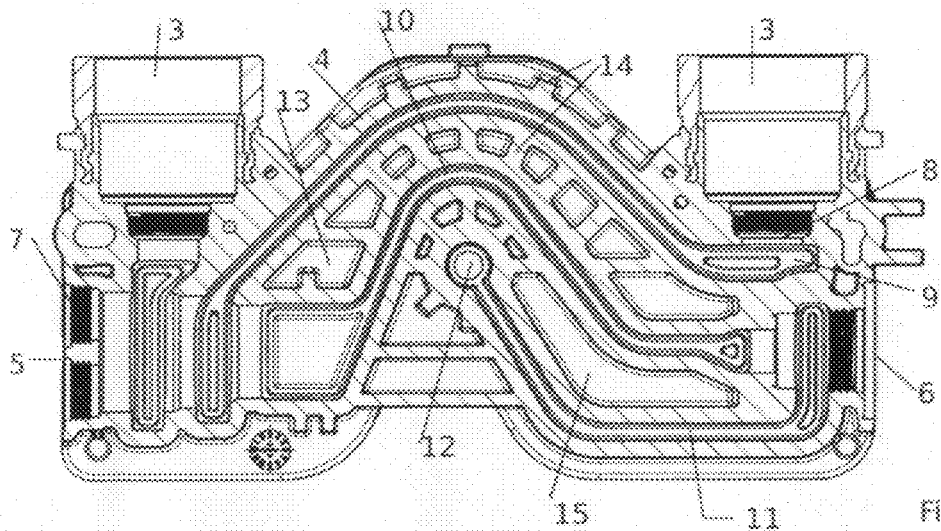
FIG. 3 shows a longitudinal section in a plane parallel to the plane of FIG. 1.

FIG. 3 now shows a section through the connector block 4 of the fitting main body in a plane running parallel to the drawing plane of FIG. 1. The inserts 3 for the connectors are arranged at the top in FIG. 3. It can be seen that the inserts 3 are inserted into the connector block 4 composed of plastic and are insert-moulded therein.

The receptacle 5 for the thermostat valve is illustrated again on the left in FIG. 3, and the receptacle 6 for the flow-rate regulating valve is illustrated on the right in FIG. 3.

From the receptacle for the insert 3 for one connector of the water line, an aperture 7 leads directly into the receptacle 5 for the thermostat valve. Said aperture 7 forms an inflow duct, which is however very short.

From the receptacle for the connector, illustrated on the right in FIG. 3, of the second water line, an aperture 8 leads into a duct 9 which extends along an arc to the receptacle 5 for the thermostat valve. Said duct is likewise an inlet duct.

A duct 10 leads from the receptacle 5 for the thermostat valve to the receptacle 6 for the flow-rate regulating valve. Said duct serves to conduct the mixed water exiting the thermostat valve, that is to say water with a mixture temperature, to the inlet of the flow-rate regulating valve. Said duct is thus the mixed-water duct. A further duct 11 leads from the receptacle 6 for the flow-rate regulating valve to an opening 12 approximately in the centre of the fitting main body. Said duct 11 is controlled by the flow-rate regulating valve. Said duct is thus the outflow duct, since the opening 12 forms the outlet from the fitting main body and thus from the sanitary fitting.

It can be seen from the section of FIG. 3 that, between the ducts 9 and 10, intermediate spaces 13 are formed which are partially bridged by ribs 14. An intermediate space 15 is formed also between the duct 10 and the outflow duct 11.

Figure 4:
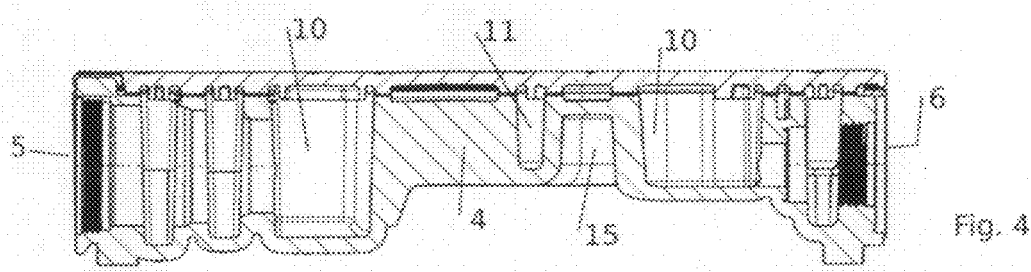
FIG. 4 shows a longitudinal section in a plane parallel to FIG. 2.

FIG. 4 shows another longitudinal section through the fitting main body. In this illustration, the cover 1 is arranged at the top. The section runs in a plane in which the axes of the receptacles 5, 6 for the valve device lie. Therefore, approximately in the centre of FIG. 4, the section runs through the outlet duct 11. It can be seen here that the cross section of the outlet duct 11 has the shape of a rectangle which is rounded on the lower side and which has a longitudinal axis perpendicular to the parting surface between the connector block 4 and the cover 1. The two side walls deviate slightly from parallelism, corresponding to a demoulding angle which is conventional in the case of the production of the fitting main body by plastic injection moulding. It can likewise be seen that the duct 11 is separated from the mixed-water duct 10 by the intermediate space 15. The cross section through the mixed-water duct 10 also has the same shape as the cross section through the outlet duct 11. This does not clearly emerge from FIG. 4 merely because the section is oriented in the longitudinal direction of the mixed-water duct 10.

Figure 5:
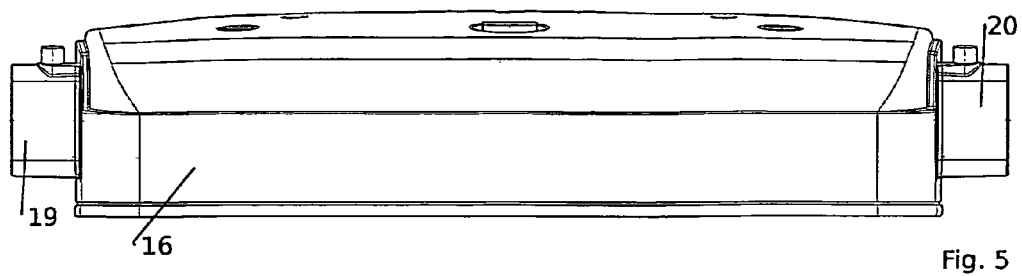
FIG. 5 shows a front view of a sanitary fitting according to the invention.
Figure 6:
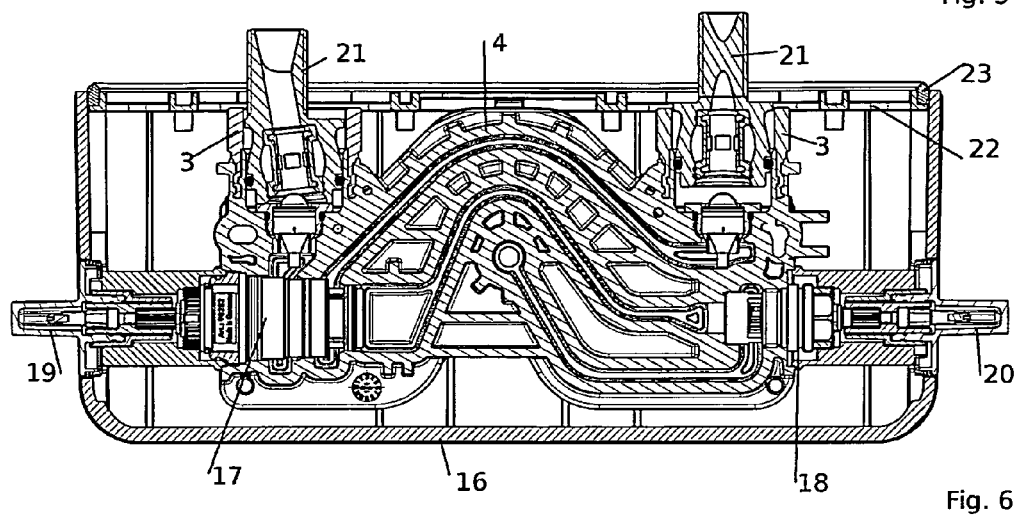
FIG. 6 shows a section through the sanitary fitting in the same plane as FIG. 3.

FIGS. 5 and 6 should be viewed jointly. Whereas FIGS. 1 to 4 show only the connector block 4, which is covered by the cover 1, of the fitting main body, FIGS. 5 and 6 now show the sanitary fitting with the fitting main body and the valve devices, and also with a rose 16 which covers the fitting main body.

The illustration of the fitting main body in FIG. 6 corresponds to the illustration in FIG. 3. A thermostat valve 17 is inserted into and fastened in the receptacle 5. A flow-rate regulating valve 18 is inserted into the receptacle 6. Both valve devices have an actuating element in the form of a knob 19, 20. Into the inserts 3 there is inserted in each case one S-type connector 21 by means of which the sanitary fitting is screwed to the water line. The housing 16, also referred to as a rose, has on its rear side a plate 22 which is provided with an encircling seal 23. In this form, the sanitary fitting is connected to the water line.

The user thus sees the sanitary fitting as illustrated in FIG. 5. The knobs 19, 20 by means of which the fitting is operated project out of the housing at the two outer sides of the housing 16.

Figure 7:
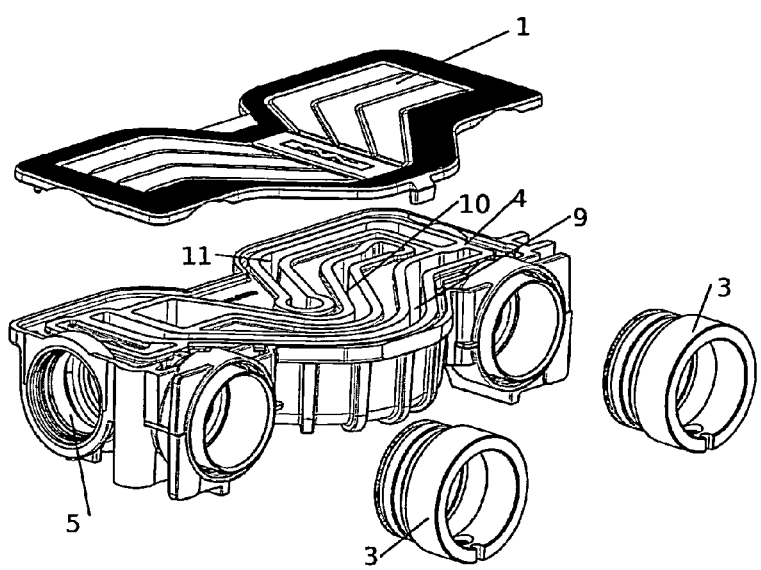
FIG. 7 shows an exploded illustration of the individual parts of the fitting main body.

FIG. 7 shows once again the details of the fitting main body in an exploded illustration. The fitting main body is composed of the connector block 4, which comprises the water channels, and the cover 1 illustrated thereabove. The two inserts 3 for the connectors of the water lines are illustrated outside the fitting main body. The receptacle 5 for the thermostat valve is arranged on the left in FIG. 7. The individual ducts 9, 10, 11 can be seen from the top side of the lower part of the fitting main body. The rectangular shape of the cross section of the ducts can also be seen here. The ducts are formed in the connector body 4 so as to be open only towards the top side of the fitting main body 4 along their length without having an undercut in the direction of the parting surface. Said ducts are closed by the mounting of the cover 1.

Figure 8:
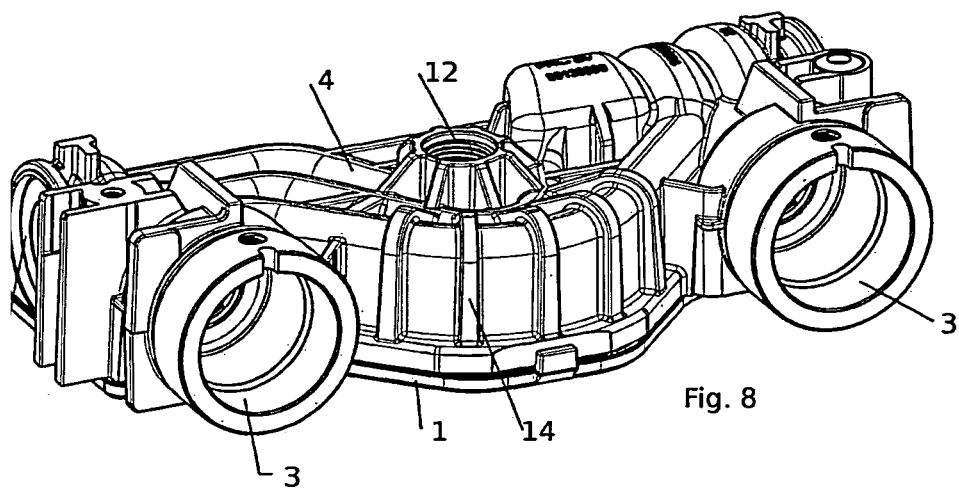
FIG. 8 shows a perspective view of the assembled fitting main body in a view from the rear and from below.

FIG. 8 shows a perspective view of the fitting main body from the rear and from below. The side walls of the inlet duct 9, which are illustrated at the front in FIG. 8, are reinforced by the abovementioned ribs 14, wherein the ribs 14 also extend between the side walls of the individual ducts. It can also be seen that the outlet 12 from the fitting main body is provided with a thread.

Figure 9:
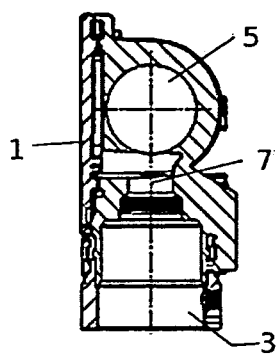
FIG. 9 shows a cross section through the fitting main body of FIG. 8 at the level of one connector.

The following three figures now show cross sections through the fitting main body. The cross section of FIG. 9 extends through one connector 3, specifically the connector which leads via the aperture 7 to the receptacle 5 for the thermostat valve 17.

Figure 10:
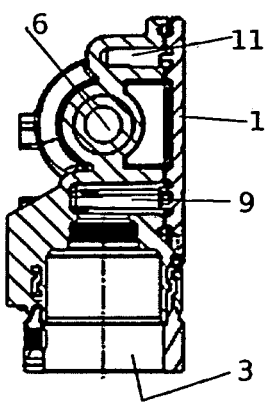
FIG. 10 shows a cross section through the fitting main body of FIG. 8 at the level of the other connector.

FIG. 10 now shows a cross section at the level of the receptacle 3 at the other end of the fitting main body 4, wherein said section also leads through the receptacle 6 for the flow-rate regulating valve 18. From a comparison with FIG. 3, it is also evident that here, in the section, it is possible to see the ducts 9 and 11, which are both in the form of flat ducts and are open towards the parting surface between the connector block 4 of the fitting main body and the cover 1 thereof.

Figure 11:
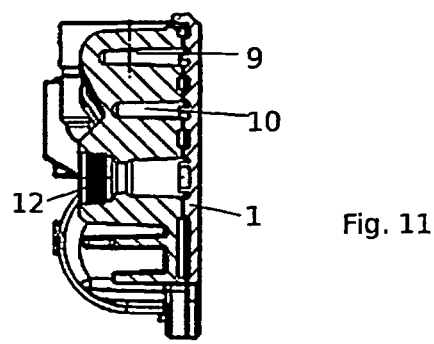
FIG. 11 shows a cross section through the fitting main body of FIG. 8 at the level of the outlet.

The section in FIG. 11 leads approximately through the centre of the fitting main body. Here, too, it is possible to see the approximately rectangular shape of the inlet duct 9 and of the mixed-water duct 10.

Figure 12:
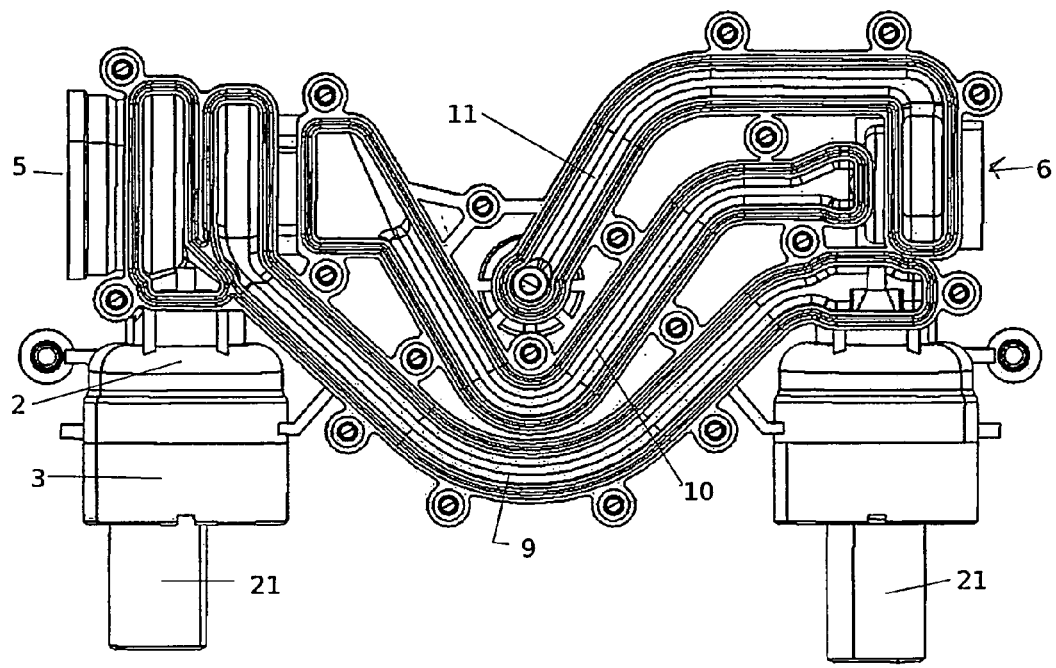
FIG. 12 shows a plan view, corresponding to FIG. 3, of a further embodiment.
Figure 13:
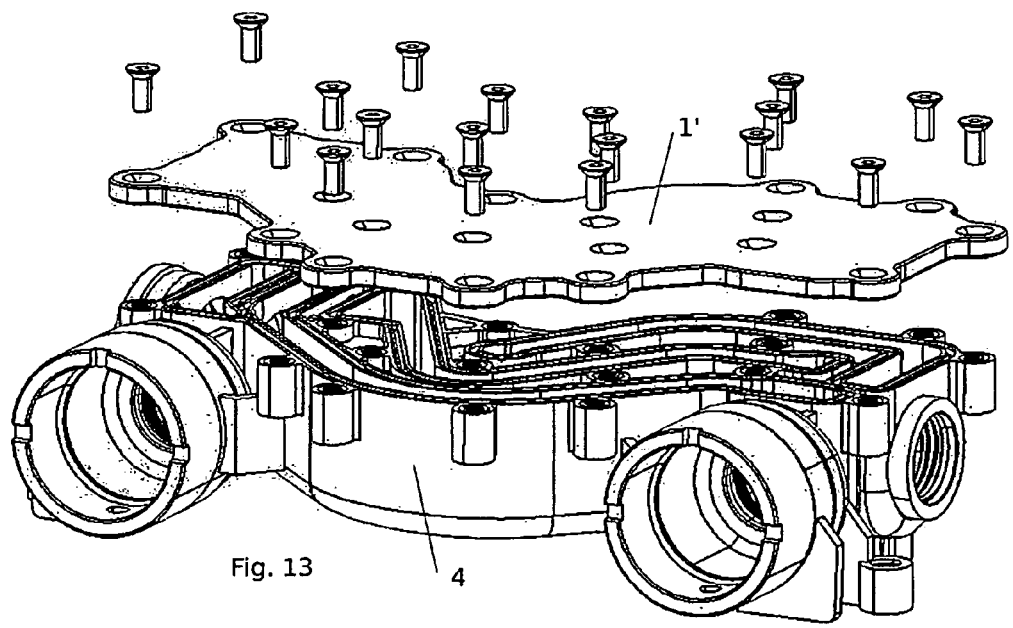
FIG. 13 shows a perspective view of the embodiment of FIG. 12 with the cover arranged thereabove.

FIG. 12 shows a plan view, corresponding to FIG. 3, of a further embodiment, in which identical components are denoted by the same reference numerals. On the outer sides of the side walls of the ducts there are arranged cylindrical connecting pieces which serve for receiving screws. As can be seen in the exploded illustration of FIG. 13, the ducts 9, 10, 11, which in this case likewise run parallel to the parting surface between the fitting main body 4 and the cover 1, are covered by a cover 1' which is fixedly screwed to the connector block 4 of the fitting main body with the aid of screws.

The invention claimed is:

1. A fitting main body for a sanitary fitting, comprising
   a connector region having at least two connectors for connection to in each case one water line,
   at least one receptacle configured to receive a valve device inserted into the receptacle,
   a connector for an outlet from the sanitary fitting, and
   ducts between the connectors, the valve device and the outlet, which ducts are formed in the fitting main body,
   said fitting main body having a connector block and a cover block connected to said connector block along a parting surface, wherein the ducts run without crossing one another, and partially parallel to one another, wherein at least one of said ducts runs parallel to the parting surface,
   wherein each of said ducts is open in the direction of the parting surface and does not have an undercut in the direction of the parting surface,
   wherein said connector region and said at least one receptacle are formed in said connector block,
   wherein the receptacle for the valve device is provided in the connector block and is configured to receive at least one of a mixing valve and a thermostat valve inserted into the receptacle, which receptacle is connected via in each case one inflow duct to the two connectors and from which receptacle a mixed-water duct leads to a receptacle in the connector block for a flow-rate regulating valve which is connected via an outflow duct to the outlet,
   wherein axes of the receptacles for the valves are situated in one of a same plane as axes of the connectors, and in a plane parallel and offset with respect to said same plane as the axes of the connectors, and
   wherein said same plane as the axes of the connectors is parallel to the parting surface at which the connector block and the cover block are connected.

2. The fitting main body according to claim 1, wherein at least one said duct is in a form of a flat duct with two at least approximately parallel walls, wherein a longitudinal direction of a cross section of the flat duct runs perpendicular to the parting surface between the cover and the fitting main body.

3. The fitting main body according to claim 1, wherein a plurality of said ducts are open towards a same side of the fitting main body.

4. The fitting main body according to claim 3, wherein all of the ducts are closed off by the same said cover block.

5. The fitting main body according to claim 1, having at least two said ducts which are open in the direction of two different sides of the fitting main body and which are each closed off by a cover.

6. The fitting main body according to claim 5, wherein the two sides of the fitting main body are situated opposite one another.

7. The fitting main body according to claim 1, wherein a receptacle for at least one said valve device is arranged with an axis perpendicular to the axis of an associated one of the connectors.

8. The fitting main body according to claim 1, wherein the fitting main body is of unipartite form.

9. The fitting main body according to claim 1, wherein walls of the ducts in the fitting main body are separated by intermediate spaces, and further comprising ribs for at least one of reinforcing and connecting the duct walls.

10. The fitting main body according to claim 1, being composed at least in part of metal.

11. The fitting main body according to claim 1, being composed at least in part of plastic.

12. The fitting main body according to claim 1, wherein the connectors of the fitting main body are formed for receiving one of S-type connectors and inserts for receiving S-type connectors.

13. The fitting main body according to claim 1, wherein the connectors have smooth walls.

14. The fitting main body according to claim 1, wherein a connector for the outlet has one of a pipe connector thread and an inserted insert with a pipe connector thread.

15. The fitting main body according to claim 1, wherein all of the connectors are reinforced by inlaid metal bushings.

* * * * *